(12) United States Patent
Sun et al.

(10) Patent No.: US 12,526,567 B2
(45) Date of Patent: Jan. 13, 2026

(54) SETUP MANAGEMENT FOR EAR TIP SELECTION FITTING PROCESS

(71) Applicant: Apple Inc., Cupertino, CA (US)

(72) Inventors: Kang Sun, Los Gatos, CA (US); Sriram Hariharan, San Jose, CA (US); Robert D. Watson, Menlo Park, CA (US); Sarang S. Ranade, San Jose, CA (US); Kevin Durfee, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/331,808

(22) Filed: Jun. 8, 2023

(65) Prior Publication Data

US 2023/0328420 A1    Oct. 12, 2023

Related U.S. Application Data

(62) Division of application No. 16/918,944, filed on Jul. 1, 2020, now Pat. No. 11,706,555.

(60) Provisional application No. 62/871,626, filed on Jul. 8, 2019.

(51) Int. Cl.
| | |
|---|---|
| *H04R 1/10* | (2006.01) |
| *H04B 5/00* | (2024.01) |
| *H04L 65/60* | (2022.01) |
| *H04W 4/80* | (2018.01) |

(52) U.S. Cl.
CPC ........... *H04R 1/1016* (2013.01); *H04L 65/60* (2013.01); *H04W 4/80* (2018.02); *H04R 2420/07* (2013.01)

(58) Field of Classification Search
CPC ............... H04R 1/1016; H04R 1/1041; H04R 2420/07; H04R 29/001; H04R 2460/15; H04R 3/04; H04B 5/0006; H04L 65/1059; H04L 65/60; H04L 65/80; H04L 67/303; H04L 41/0896; H04W 4/80
USPC .......................... 381/74, 312, 104, 1; 700/94
See application file for complete search history.

(56) References Cited

U.S. PATENT DOCUMENTS

| | | | |
|---|---|---|---|
| 8,401,200 | B2 | 3/2013 | Tiscareno et al. |
| 9,293,128 | B2 | 3/2016 | Goldstein |
| 9,609,424 | B2 | 3/2017 | Goldstein |
| 11,069,358 | B1 * | 7/2021 | Harper ..................... G10L 15/26 |
| 11,153,678 | B1 * | 10/2021 | Jorgovanovic ........ H04W 76/14 |
| 2010/0074451 | A1 | 3/2010 | Usher et al. |

(Continued)

FOREIGN PATENT DOCUMENTS

| | | |
|---|---|---|
| CN | 106375892 A | 2/2017 |
| CN | 208227263 U | 12/2018 |
| KR | 10-2018-0062270 A | 6/2018 |

*Primary Examiner* — Lun-See Lao
(74) *Attorney, Agent, or Firm* — Aikin & Gallant, LLP

(57) ABSTRACT

A method performed by a programmed processor of an in-ear headphone that is to be worn by a user. The method obtains, over a wireless communication link and via a first wireless connection that uses an accessory profile, a first request, from an audio source device, to start a measurement process. In response to obtaining the request, the method 1) establishes, over the link, a second wireless connection that uses an audio distribution profile between the headphone and the source device, 2) obtains, via the second wireless connection, an audio signal for driving a speaker of the headphone to output sound, 3) responsive to the outputted sound, determining a fit parameter, and 4) transmitting the fit parameter to the source device via the first wireless connection.

20 Claims, 7 Drawing Sheets

(56) References Cited

U.S. PATENT DOCUMENTS

| | | | |
|---|---|---|---|
| 2011/0116643 A1 | 5/2011 | Tiscareno et al. | |
| 2013/0170656 A1 | 7/2013 | Tiscareno et al. | |
| 2014/0037096 A1 | 2/2014 | Duisters | |
| 2015/0310846 A1 | 10/2015 | Andersen et al. | |
| 2016/0330546 A1 | 11/2016 | Barrentine et al. | |
| 2017/0013345 A1 | 1/2017 | Kumar et al. | |
| 2017/0193974 A1 | 7/2017 | Gadonniex et al. | |
| 2017/0193978 A1 | 7/2017 | Goldman | |
| 2017/0214994 A1 | 7/2017 | Gadonniex et al. | |
| 2018/0122357 A1 | 5/2018 | Thornock et al. | |
| 2018/0132048 A1 | 5/2018 | Usher et al. | |
| 2018/0270564 A1 | 9/2018 | Kumar et al. | |
| 2018/0295455 A1* | 10/2018 | Eichfeld | H04R 25/652 |
| 2018/0310104 A1 | 10/2018 | Westergaard et al. | |
| 2019/0045291 A1 | 2/2019 | Kofman | |
| 2019/0052951 A1* | 2/2019 | Kofman | H04R 1/1041 |
| 2019/0278556 A1 | 9/2019 | Usher | |
| 2020/0120727 A1* | 4/2020 | Batta | H04W 76/14 |
| 2020/0275223 A1 | 8/2020 | Usher | |

* cited by examiner

SETUP MANAGEMENT FOR EAR TIP SELECTION FITTING PROCESS

CROSS-REFERENCE TO RELATED APPLICATION

This application is a divisional of co-pending U.S. patent application Ser. No. 16/918,944, filed Jul. 1, 2020, which claims the benefit of priority of U.S. Provisional Patent Application Ser. No. 62/871,626, filed Jul. 8, 2019, which is hereby incorporated by this reference in its entirety.

FIELD

An aspect of the disclosure relates to setting up an ear tip selection fitting process to be performed by an audio system. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a method performed by an audio system having an in-ear headphone and an audio source device to set up an ear-tip selection fitting process that determines whether an ear tip that is coupled to the in-ear headphone properly fits inside the user's ear. To set up the fitting process, the in-ear headphone obtains a first request from the audio source device to start the fitting process, over a wireless communication link and via a first wireless connection that uses an accessory profile. In response to obtaining the request, a second wireless connection that uses an audio distribution profile is established between the in-ear headphone and the audio source device. Via the second wireless connection, the in-ear headphone obtains an audio signal for driving a speaker to output sound into the user's ear canal. Responsive to the outputted sound, the in-ear headphone may measure a frequency response of the ear canal and determine a fit parameter for the ear tip based on the measured frequency response. The in-ear headphone then transmits the fit parameter to the audio source device via the first wireless connection.

In one aspect, the communication link is a wireless BLUETOOTH link that is established between the source device and the headphone. In this case, the audio distribution profile is a BLUETOOTH Advanced Audio Distribution Profile (A2DP). The accessory profile may be another profile, other than A2DP, such as BLUETOOTH Serial Port Profile (SPP).

In some aspects, the audio system determines whether the ear-tip selection fitting process is a success or a failure. For instance, a failed fitting process may be based on whether ambient noise within the environment has interfered with the fitting of the frequency response. As another example, the fitting process may be deemed a failure when the fit parameter is outside an expected range. As a result of a failed fitting process, the audio system may repeat the setup and performance of the ear-tip selection fitting process. On the other hand, if the fitting process is deemed a success (e.g., based on the fit parameter being within an expected range) the audio system may stop the fitting process. For example, the audio system may stop transmitting the audio signal to the in-ear headphone and tear down the second wireless connection.

In some aspects, the audio system may terminate the fitting process before a fit parameter is determined by the in-ear headphone under certain conditions. For instance, the audio system may obtain a request to playback a different audio signal through the in-ear headphone. In this case, the audio source may transmit a request to the in-ear headphone to stop the process via the first wireless connection. Once an acknowledgement is received from the in-ear headphone, via the first wireless connection, the audio source device may stop transmission of the audio signal and tear down the second wireless connection.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1A:
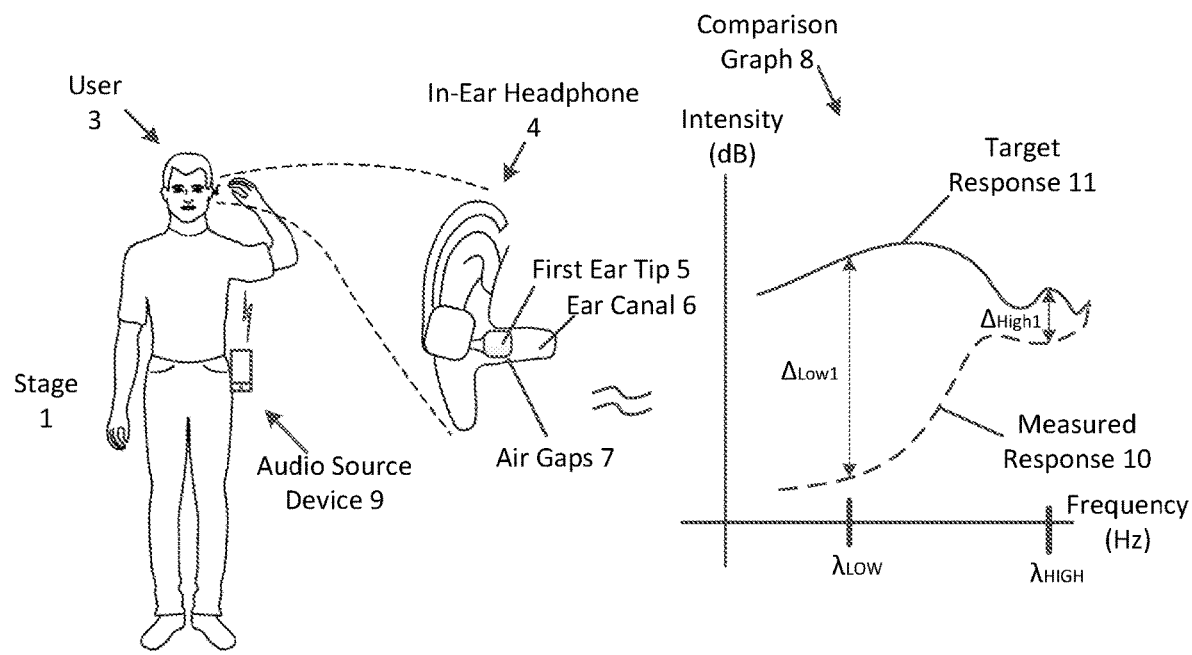
FIGS. 1A and 1B show a progression of stages of a fitting process in which an ear tip is selected that best fits a user's ear canal.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Many in-ear headphones, such as earphones or earbuds, rely on ear tips (or earphone tips) to improve user experience. An ear tip is an outer structure that surrounds a portion of an in-ear headphone that may include a speaker, which is configured to output sound into a user's ear canal. In some aspects, the ear tip may be formed out of a flexible or moldable material (e.g., silicone, rubber, plastic, foam, etc.) in order to form a better fit within the canal. To use an in-ear headphone, the user inserts the in-ear headphone (or more specifically the portion that includes the ear tip) into the user's ear canal. The ear tip is configured to conform around (or make contact with) the user's ear canal, thereby forming an air-tight seal. This seal helps to reduce an amount of external environmental noise from leaking into the user's ear canal while the headphones are in use. In addition, this seal enables the headphones to provide a better low-frequency response, thereby providing an overall better sound experience to the user. If, however, the seal is not air tight or there is no seal at all, the low-frequency response may suffer because sound pressure produced by the movement of the speaker will escape from the ear canal into the environment. In addition, if there is no seal, the environmental noise may leak into the user's ear canal. Therefore, it is important for the ear tip to form an almost-perfect seal inside the ear canal.

However, manufacturers generally provide a single "one-size-fits-all" pair of ear tips with a given pair of in-ear headphones. Although these ear tips may provide a seal for some users, they may be less effective for other users. This is because the shape and/or size of different users' ear canals may vary from user-to-user. For instance, some ear tips may be too small for some ear canals. To overcome this issue, a user may purchase replacement pairs of ear tips of different sizes, and choose the size that best fits the user. This process may be time consuming and inefficient. For instance, for the user to select the most-optimal ear tip, the user will have to test each pair manually and (subjectively) decide which ear tip enables the headphones to provide better sound (e.g., the best low-frequency response, as previously described). As used herein, "optimal" refers to the ear tip that is the best fit for the user's ear canal (e.g., creates the air tight seal) and/or enables the headphones to provide an overall better sound experience than other ear tips. Thus for each pair of ear tips, the user will have to replace existing ear tips on the headphones, cause the headphones to playback audio content (e.g., causing a companion multimedia device that is paired with the earbuds to stream music through the earbuds), and compare the overall sound experience between ear tips to decide (or choose) which is better.

To overcome these deficiencies, the present disclosure describes an audio system that is capable of performing an ear tip fitting process (or fitting process) that automatically determines which pair of ear tips of a plurality of pairs of ear tips is most optimal (e.g., having the best fit) for a given user. Specifically, for each ear tip, the audio system measures a frequency response of a user's ear canal (e.g., a left ear canal and a right ear canal) responsive to outputting a sound (e.g., a test sound). The system determines a (e.g., fit) parameter that indicates how well the ear tip is fitted into the user's respective ear canal based on the measured frequency response. The audio system compares the fit parameter with at least one previously determined fit parameter for a different ear tip and selects the ear tip that has a higher fit parameter than each of the other ear tips. Thus, such an audio system is able to automatically select the most optimal ear tips, thereby alleviating the need for a user to manually determine which ear tips should be used.

A fit parameter may be based on a region (or portion) of the measured frequency response with respect to a target frequency response. For instance, as described herein, one characteristic of an optimal ear tip is one that creates the best air-tight seal.

In one aspect, to determine which ear tip provides the best air-tight seal, the fit parameter may be based on a low-frequency portion (e.g., a frequency portion or band below 1000 Hz) of the measured frequency response as described herein. For instance, an ear tip that has a low-frequency response that is closer to a target response may have a higher fit parameter than another ear tip that has a low-frequency response which is more distant (or dissimilar) to the target response (or below a threshold). However, although such an ear tip may provide a better seal, it does not necessarily mean that the ear tip is the "best fit" for a particular user. For example, when inserted into an ear canal, the ear tip conforms to a shape of the ear canal. Since the shape of the canal may vary between users, this conformity may significantly alter the shape of the ear tip which may negatively impact audio performance of the headphone. For instance, the ear canal may narrow towards the user's ear drum. When the ear tip is inserted, the narrow portion of the ear canal may pinch an opening of the ear tip (the most distal portion of the ear tip). This pinching may reduce some of the spectral content of the sound output, such as high-frequency content from entering the user's ear canal, since it is being contained within the ear tip. This pinching, however, may not affect other frequency content, such as low-frequency content. Thus, a fit parameter that is only based on the low-frequency response does not take into account any adverse effects that a deformed ear tip may cause to the high-frequency response of the ear tip.

The present disclosure describes an audio system that overcomes these deficiencies by determining a fit parameter of an ear tip based on differences (or deltas) between a measured frequency response and a target frequency response at one or more frequency bands. For instance, the audio system determines the fit parameter for a given ear tip based on a difference between the measured frequency response and a target frequency response at a low-frequency band that is less than 1000 Hz, such as between 20 Hz-400 Hz. As another example, the low-frequency band may be any band within that band, such as 80 Hz-200 Hz. In addition, the fit parameter may be based on a difference between the two responses at a high-frequency band that is equal to or greater than 1000, such as between 1 KHz-20 KHz. As another example, the high-frequency band may be any band within that band, such as 1000 Hz-1400 Hz. In one aspect, the low-frequency band and/or high-frequency band may be a single frequency (e.g., the low-frequency band may be 80 Hz). In one aspect, the system can compare fit parameters between ear tips and select the ear tip with the highest fit parameter of the other fit parameters. In one aspect, the highest fit parameter may correspond to the ear tip that has at least one of the lowest differences between its corresponding measured frequency response and the target frequency response compared to the other ear tips.

Figure 1B:
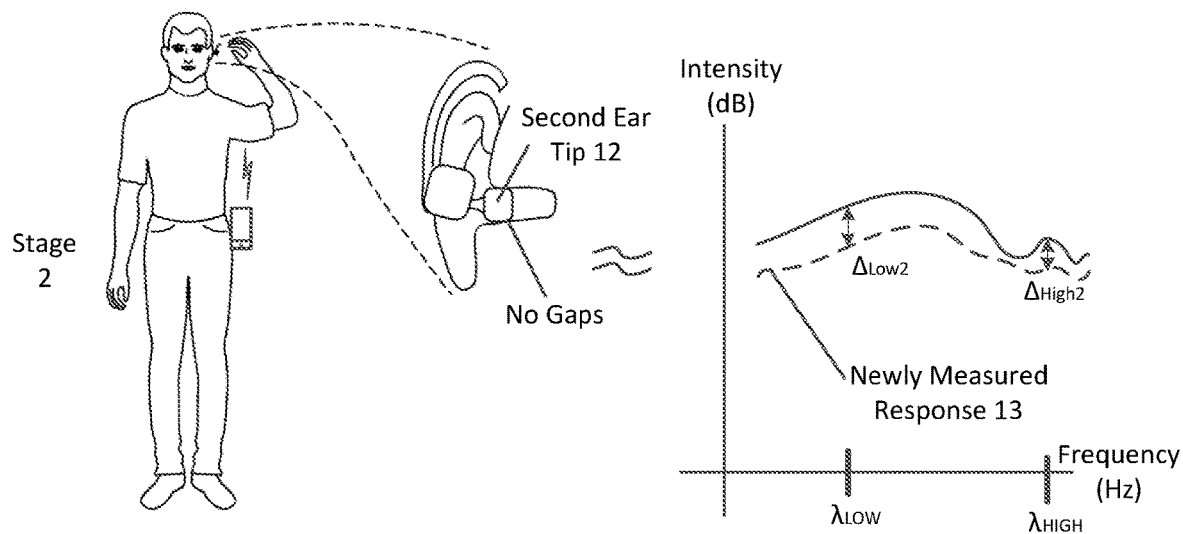

FIGS. 1A and 1B show a progression of stages of a fitting process in which an ear tip is selected that best fits (or most-optimally or properly fits, e.g., "best suited" for) a user's ear canal. Specifically, these figures illustrate two stages 1 and 2 in which a user 3 is inserting an in-ear headphone 4 with different ear tips and a comparison graph 8 that shows a measured frequency response for each ear tip with respect to a target frequency response.

FIG. 1A illustrates stage 1, which shows a user 3 putting on an in-ear headphone 4 (a left headphone) that has a first ear tip 5 into the user's left ear. As illustrated in this figure, the headphone 4 is an earphone that is configured to (interchangeably) couple with the first ear tip 5. To put on the headphone 4, the user 3 has inserted the portion of the headphone that includes the first ear tip 5 into the user's ear canal 6. In addition, the user 3 has an audio source device 9, illustrated as a smart phone. As described herein, the audio source device 9 may pair with the in-ear headphone 4 to form an audio computer system (or audio system) 20 that performs an ear tip fitting process. For instance, the in-ear headphone 4 may be a wireless electronic device that is configured to establish a wireless connection with the audio source device via a wireless communication link (e.g., via BLUETOOTH protocol or any other wireless communication protocol). During the established wireless communication link, the in-ear headphone may exchange (e.g., transmit and receive) data packets (e.g., Internet Protocol (IP) packets) with the audio source device. More about establishing a wireless communication link and exchanging data is described herein.

Also illustrated in this figure are air gaps 7 that are formed between the first ear tip 5 and (side walls) of the ear canal 6. The gaps 7 may be the result of the ear tip 5 being too small for the user's ear canal 6 (and/or the result of the shape of the ear canal 6, as described herein).

With the headphone 4 on (or in an "in-use" state), an ear tip fitting process may be performed. For instance, the headphone 4 may obtain an audio signal (e.g., test signal) from the audio source device 9 over the communication link and drive a speaker 22 with the audio signal to output a sound into the user's ear canal 6. An internal microphone 23 of the in-ear headphone 4 produces a microphone signal responsive to the outputted sound. From the microphone signal, a frequency response of the user's ear canal 6 is measured.

The comparison graph 8 shows a graphical representation of the measured frequency response 10 with respect to a graphical representation target response 11. Specifically, the graph shows the intensity (or energy) level of the response with respect to frequency. In one aspect, the target response 11 may be a predefined response that was measured in a controlled environment (e.g., laboratory). In another aspect, the target response 11 may be a response for an average of the overall population. In yet another aspect, the target response 11 may be a response that is produced when this particular (or any particular) ear tip creates the air-tight seal within a user's ear canal. As illustrated, there are two deltas in the graph 8 that represent differences between the target response 11 and the measured response 10 at a given frequency (or frequency band). Specifically, the graph 8 shows a $\Delta_{Low1}$ at a low frequency $\lambda_{Low}$ and a $\Delta_{High1}$ at a higher frequency $\lambda_{High}$. In one aspect, the low-frequency content of the measured response 10 is far lower than the target response 11, resulting in the $\Delta_{Low1}$ being high. As described herein, this discrepancy may be due to the fact that the ear tip 5 is not creating the air-tight seal since there are multiple air gaps 7.

As described herein, the device 4 may determine a fit parameter based on the measured response 10 (and/or the difference between the measured response 10 and the target response 11). Since the difference $\Delta_{Low1}$ is large, the fit parameter may be determined to be a low value (e.g., in a range of 1 to 100, the fit parameter may be 30). In one aspect, the value may be based on both (or some) of the $\Delta$s illustrated in the graph 8. In one aspect, the fit parameter may correspond to the intensity or energy level of the spectral content at a given frequency. Thus, the fit parameter may be an array of values, which may correspond to the intensity level (e.g., 10 dB for $\Delta_{Low1}$ and 3 dB for $\Delta_{High1}$). In some aspects, the fit parameter may be any relationship between the measured response and the target response. More about the determining the fit parameter is described herein.

From the fit parameter, the audio system may determine whether the ear tip is best suited for user 3. For instance, the in-ear headphone 4 may wirelessly transmit the fit parameter to the audio source device 9 to make this determination. In one aspect, the audio source device 9 may compare the fit parameter to a target fit parameter, which may be a predefined (e.g., laboratory tested) fit parameter. Continuing with the previous example, when the fit parameter is 30, the audio source device 9 may compare the parameter to a target parameter of 50. Since the fit parameter is below the target parameter, the first ear tip 5 that is currently used does not fit properly within the user's ear canal. In one aspect, the audio source device 9 may notify user 3 to try a different ear tip. Specifically, the device 9 may output notification audio (via an integrated speaker) indicating that the ear tip 5 that is currently selected does not fit the user's ear canal properly, and notifying the user 3 to replace the existing tip 5 with another tip. In another aspect, the device 9 may compare the currently-determined fit parameter with one or more previously-determined fit parameters for different ear tips. More about how the system determines whether the ear tip is optimal based on comparing fit parameters is described herein.

FIG. 1B illustrates stage 2, which shows the user 3 putting on the in-ear headphone 4 that has a second ear tip 12. For instance, the user 3 may have replaced the first ear tip 5 with the second ear tip 12 in response to being notified to do so by the notification audio. As shown, when the second ear tip 12 is inserted into the user's ear canal 6, there are no longer any gaps. In one aspect, the second ear tip 12 is bigger (or wider) than the first ear tip 5 resulting in the ear tip 12 forming a better seal within the ear canal 6.

Again, with the second ear tip 12 being in use, the audio system may perform another ear-tip fitting measurement (e.g., responsive to outputting an audio signal, the headphone may measure a new frequency response of the user's ear canal). As illustrated in the comparison graph 8 of stage 2, a newly measured frequency response 13 for the second ear tip 12 is a better approximation to the target response 11 than the previous response 10. Specifically, $\Delta_{Low2}$ is illustrated as being lower than $\Delta_{Low1}$ (e.g., 2 dB rather than 10 dB). The difference in the low-frequency band may be the result of the second ear tip 12 creating a (better) air tight seal than the first ear tip 5. In addition, the $\Delta_{High2}$ is illustrated as being lower than $\Delta_{High1}$ (e.g., 1 dB, rather than 2 dB). This may indicate that the first ear tip 5 was deformed (e.g., pinched) while inside the ear canal 6, resulting in a worse high-frequency response than the second ear tip 12.

As a result of the newly-measured frequency response 13 being a better approximation, the fit parameter for the second ear tip 12 may be higher than the fit parameter for the first ear tip 5 (e.g., 70 out of 100). In one aspect, the audio source device 9 may compare the newly-determined fit parameter to the target fit parameter. If the fit parameter is above the target parameter, the in-ear headphone 4 may determine that the second ear tip 12 fits well (e.g., fits properly within the user's ear canal). In some cases, the in-ear headphone may notify the user that the second ear tip 12 provides a good (or suited) fit and may end the fitting process.

In another aspect, the audio source device 9 may compare the newly-determined fit parameter with the previous fit parameter to determine which ear tip to select. In this case, since the second ear tip 12 has a higher fit parameter than the first ear tip 5, the user 3 may be notified that the current ear tip 12 is the better ear tip of the two. Thus, the previous fit parameter may be a threshold to which the newly-determined fit parameter is compared. Thus, similar to the notifications described herein, the in-ear headphone 4 may output audio notifying the user 3 to use ear tip 12.

Although illustrated as only performing a fitting process for a left in-ear headphone, it should be understood that this process may be performed for a pair (left and right) in-ear headphones. For instance, the process may be performed while both in-ear headphones are inserted into respective ears of the user, or the process may be performed individually.

Figure 2:
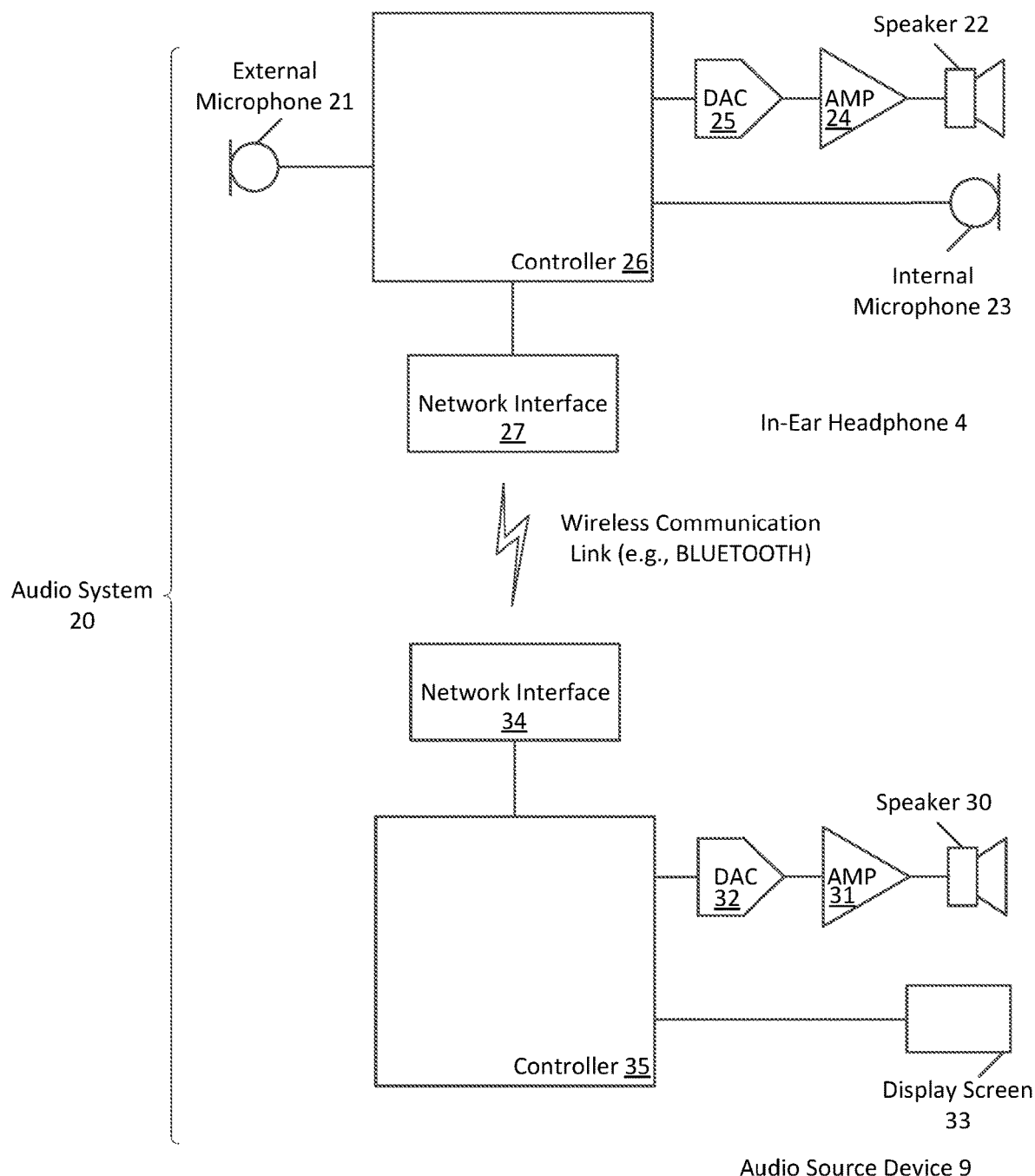
FIG. 2 shows a block diagram of an audio system that performs a fitting process to select an ear tip.

FIG. 2 shows a block diagram of an audio system 20 that includes the in-ear headphone 4 and the audio source device 9. The in-ear headphone 4 includes an external microphone 21, the speaker 22, an amplifier (AMP) 24, a digital-to-analog converter (DAC) 25, the internal microphone 23, a controller 26, and a network interface 27. In one aspect, the headphone 4 may include more or less elements (or components) as described herein. For instance, the headphone 4 may include two or more speakers 22, two or more external (and/or internal) microphones, and/or a display screen.

The headphone 4 may be any electronic device that includes an interchangeable (and/or a replaceable) component that may be placed on, in, or over a user's ears. For example, when the device is an in-ear headphone, such as an earphone or earbud, the component may be an ear tip, as described herein. As another example, when the device is on-ear and/or over-the-ear headphones, the component may be an ear cup. In either case, the device may include at least one speaker that is configured to output sound into a user's ear. In one aspect, the device may be configured to be inserted or placed on a single ear of a user (e.g., a single ear bud), or the device may be configured to be inserted or placed on both ears of the user such as on-ear headphones that includes two ear cups (one for a left ear and one for a right ear) that are connected with a bridge. In one aspect, the headphones may be wired. In some aspects, the headphone 4 may be wireless such that it can establish a wireless connection link, via a network interface 27 using any wireless communication method (e.g., BLUETOOTH protocol, a wireless local network link, etc.) with another electronic device. More about how the headphone 4 establishes a wireless connection link with another device is described herein. In one aspect, the network interface 27 is configured to establish a wireless communication link with a wireless access point in order to exchange data with an electronic server over a wireless network (e.g., the Internet).

The external microphone 21 (and/or the internal microphone 23) may be any type of microphone (e.g., a differential pressure gradient micro-electro-mechanical system (MEMS) microphone) that is configured to convert acoustical energy caused by sound wave propagating in an acoustic environment into an input microphone signal. Microphone 21 is an "external" (or reference) microphone that is configured to capture sound from the acoustic environment, while microphone 23 is an "internal" (or error) microphone that is configured to capture sound (and/or sense pressure changes) inside a user's ear (or ear canal), as described herein. The speaker 22 may be an electrodynamic driver that may be specifically designed for sound output at certain frequency bands, such as a woofer, tweeter, or midrange driver, for example. In one aspect, the speaker 22 may be a "full-range" (or "full-band") electrodynamic driver that reproduces as much of an audible frequency range as possible.

The controller 26 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform ear-tip fitting process operations and networking operations. For instance, the controller 26 is configured to perform an ear tip fitting measurement to determine a fit parameter of an ear tip that is currently being used by (or is coupled to) the in-ear headphone 4. Once determined, the controller 26 may transmit, via the network interface, 27 the tip parameter to the audio source device 9 for further processing. More about the operations of the fitting process that are performed by the in-ear headphone 4 is described herein.

In another aspect, the controller 26 is further configured to perform one of several audio output modes and/or configured to perform signal processing operations, such as audio signal processing operations upon an audio (or microphone) signal produced by the microphone 21. More about these modes and operations are described herein. In one aspect, operations performed by the controller 26 may be implemented in software (e.g., as instructions stored in memory and executed by the controller 26) and/or may be implemented by hardware logic structures as described herein.

In one aspect, the controller 26 is configured to obtain an input audio signal (as an analog or digital signal) of a piece of audio program content or user-desired content (e.g., music, etc.) for playback through the speaker 22. In one aspect, as described herein, the input audio signal may be a test signal. In one aspect, the controller 26 may obtain the input audio signal from local memory, or the controller 26 may obtain the input audio signal from the network interface 27, which may obtain the signal from an external source such as the audio source device 9. For instance, the in-ear headphone 4 may stream the input audio signal from the audio source device 9 for playback through the speaker 22. The audio signal may be a signal input audio channel (e.g., mono). In another aspect, the controller 26 may obtain two or more input audio channel (e.g., stereo) for output through two or more speakers. In one aspect, in the case in which the headphone 4 includes two or more speakers, the controller 26 may perform additional audio signal processing operations. For instance, the controller 26 may spatially render the input audio channels to produce binaural output audio signals for driving at least two speakers (e.g., a left speaker and a right speaker of the headphone 4).

In one aspect, the in-ear headphone 4 may include at least two speakers that are "extra-aural" speakers configured to output sound into the acoustic environment, rather than speaker 22 that is configured to output sound into a user's ear. In another aspect, the controller 26 may include a sound-output beamformer that is configured to produce speaker driver signals, which when driving two or more speakers produce spatially selective sound output. Thus, when used to drive the speakers, the headphone 4 may produce directional beam patterns that are directed to locations within the environment.

The DAC 25 is to receive the input audio signal as an output digital audio signal that is produced by the controller 26, and is to convert it into an analog signal. The AMP 24 is to obtain the analog signal from the DAC 25, and is to provide a drive signal to the speaker 22. Although the DAC and AMP are shown as separate blocks, in one aspect the electrical circuit components for these may be combined in order to provide for a more efficient digital-to-analog conversion and amplification operation of the driver signal, e.g., using class D amplifier technology.

In some aspects, the controller 26 may include a sound-pickup beamformer that can be configured to process the audio (or microphone) signals produced two or more external microphones of the in-ear headphone to form directional beam patterns (as one or more audio signals) for spatially selective sound pickup in certain directions, so as to be more sensitive to one or more sound source locations. The headphone 4 may perform audio processing operations upon the audio signals that contain the directional beam patterns (e.g., perform spectrally shaping), and/or transmit the audio signals to the audio source device 9.

As described herein, the controller 26 may perform one of several audio output modes, each of which may perform a different level of audio isolation (e.g., preventing ambient sounds from the acoustic environment from being heard by the user). In one aspect, to perform one of the modes the controller 26 may obtain a request from the user 3. For instance, the user 3 may issue say a command (e.g., "Computer, initiate a mode.") that is captured by the microphone 21 as a microphone signal that is processed by a speech recognition algorithm to identify the command contained therein. In another aspect, the user 3 may initiate a mode by selecting a user interface (UI) item that is displayed on a display screen of the audio source device 9. Once selected, the device 9 may wirelessly transmit the command to the in-ear headphone 4.

Of the several audio output modes, there is an active attenuation mode (or first mode) and a passive attenuation mode (or second mode). While in the active attenuation mode, the controller 26 is configured to activate an active noise cancellation (ANC) function to cause the speaker 22 of the headphone to produce anti-noise in order to reduce ambient noise from the environment that is leaking into the user's ear. In one aspect, the noise may be the result of an imperfect seal of the ear tip of the headphone. The ANC function may be implemented as one of a feedforward ANC, a feedback ANC, or a combination thereof. As a result, the controller 26 may receive a reference microphone signal from a microphone that captures external ambient sound, such as microphone 21. The controller 26 is configured to produce an anti-noise signal from at least one of the microphone signals, and drive the speaker 22 to output anti-noise. In contrast to this mode, however, while in the passive attenuation mode the controller 26 is configured to not perform active noise attenuation operations. Instead, the headphone relies on the physical characteristics of the headphone (e.g., the ear tip) to passively attenuate ambient noises.

A third mode is a transparency mode in which sound played back by the headphone 4 is a reproduction of the ambient sound that is captured by the device's external microphone in a "transparent" manner, e.g., as if the headphone was not being worn by the user. The controller 26 processes at least one microphone signal captured by at least one external microphone 21 and filters the signal through a transparency filter, which reduces acoustic occlusion due to the ear tip of the headphone being in the user's ear, while also preserving the spatial filtering effect of the wear's anatomical features (e.g., head, pinna, shoulder, etc.). The filter also helps preserve the timbre and spatial cues associated with the actual ambient sound. Thus, in one aspect, the filter of the transparency mode may be user specific according to specific measurements of the user's head. For instance, the controller 26 may determine the transparency filter according to a head-related transfer function (HRTF) or, equivalently, head-related impulse response (HRIR) that is based on the user's anthropometrics.

The audio source device 9 includes a speaker 30, an AMP 31, a DAC 32, a display screen 33, a network interface 34, and a controller 35. The display screen 33 may be configured to present digital images or videos. In one aspect, the display screen 33 is a touch display screen that is configured to sense user input as input signals. In one aspect, the source device 9 may include more or less elements as described herein. For instance, the device 9 may include two or more speakers 30. In another aspect, the device 9 may include additional elements such as one or more (external) microphones.

The audio source device 9 may be any electronic device that can perform audio signal processing operations and/or networking operations. An example of such a device may be a desktop computer, a smart speaker, a digital media player, or a home entertainment system. In one aspect, the source device may be a portable device, such as a smart phone as illustrated in FIGS. 1A and 1B. As another example, the source device 9 may be any portable device that includes a network interface, such as a laptop computer, a tablet computer, a head-mounted device, and a wearable device (e.g., a smart watch).

In one aspect, the controller 35 is configured to perform fitting process operations to measure tip fit, audio processing operations, and/or networking operations. For instance, the controller 35 is configured to obtain a tip parameter from the in-ear headphone 4 and determine whether the ear tip associated with the fit parameter is suited for this given user. More about the operations of the fitting process that is performed by the source device 9 is described herein.

In another aspect, at least some of the operations performed by the audio system 20 as described herein may be performed by the source device 9 and/or by the in-ear headphone 4. For instance, the audio source device may determine the fit parameter rather than the in-ear headphone 4. In this case, the audio source device 9 may obtain a measured frequency response by the in-ear headphone 4, via the wireless communication link that pairs both devices together, and determine the fit parameter as described herein. As another example, the in-ear headphone may determine the fit parameter and may notify the user to replace an ear tip in response to the fit parameter being less than a threshold. In another aspect, at least some of the operations may be performed by a remote server, over a computer network (e.g., Internet). In some aspects, the audio source device 9 may perform at least some of the audio processing operations associated with the audio output modes, as described herein.

Figure 3:
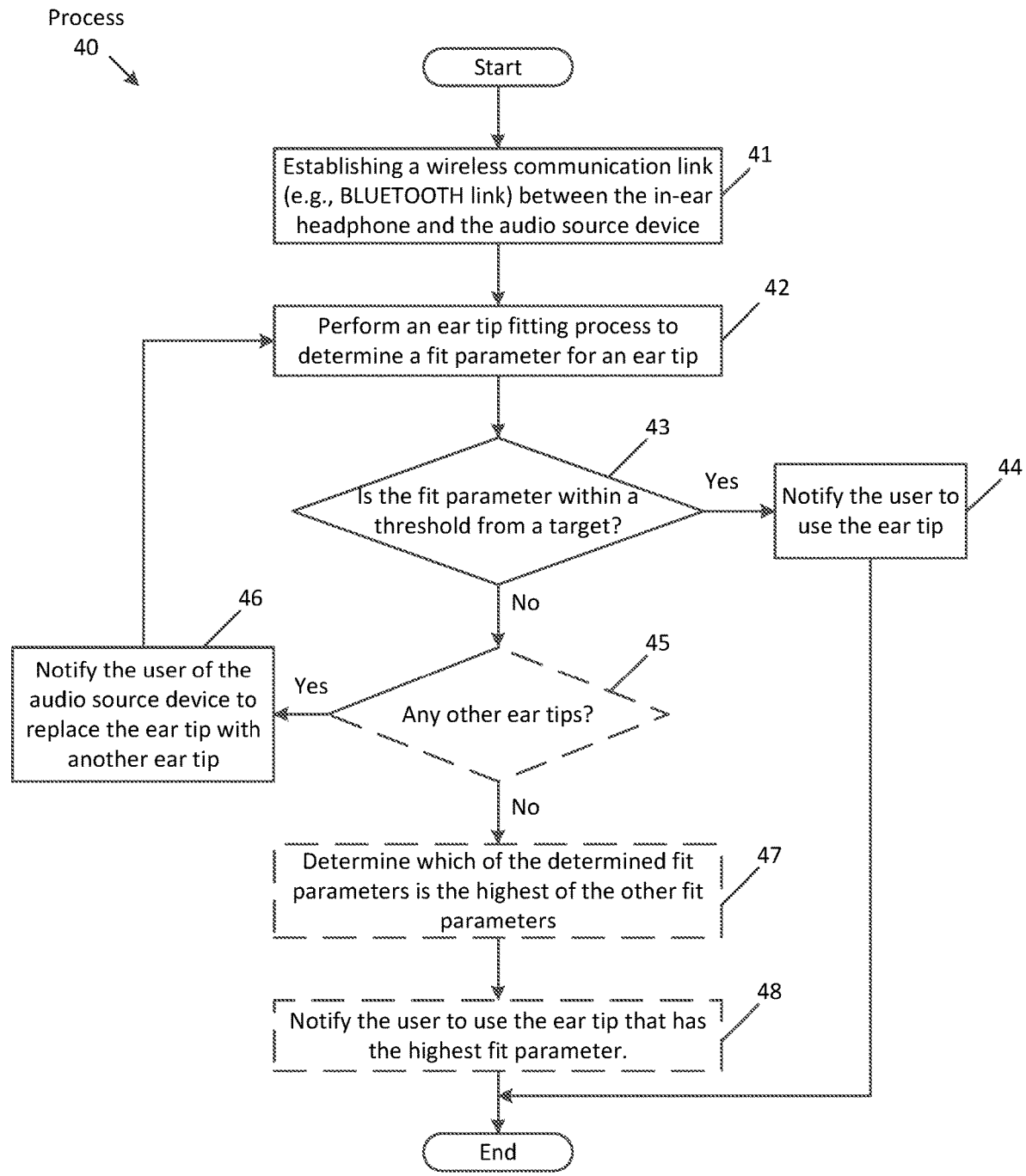
FIG. 3 is a flowchart of one aspect of a process to select an ear tip for the in-ear headphone.

FIG. 3 is a flowchart of one aspect of a process 40 to select a suitable ear tip to be used with the in-ear headphone 4, for a given user (e.g., user 3). In one aspect, the process 40 is performed by (e.g., the controller 26 of) the in-ear headphone 4 and/or by (e.g., the controller 35 of) the audio source device 9 of the audio system 20. Thus, this figure will be described with reference to FIGS. 1A, 1B, and 2. The process 40 begins by establishing a communication link between the in-ear headphone 4 and the audio source device 9 (at block 41). For instance, the audio source device 9 may form a wireless radio frequency (RF) communication link (e.g., via a BLUETOOTH protocol or any wireless connection protocol) with the in-ear headphone 4. In one aspect, the link may be in response to an automatic discovery process performed by the controller 35 (and/or the network interface 34) of the audio source device 9 to detect and pair with other RF wireless devices that are within a close proximity (e.g. 20 feet away). In one aspect, such a communication link is established automatically (e.g., without user intervention). In another aspect, the user 3 may manually establish the communication link (e.g., through a UI item displayed on the display screen 33 of the audio source device 9).

The process 40 performs an ear-tip fitting process to determine a fit parameter for an ear tip that is currently being used by (or is currently coupled to) the in-ear headphone 4 (at block 42). In one aspect, the audio system 20 may optionally notify the user which ear tip is to be used during the fitting process. For instance, the audio source device 9 may display a visual representation of which of several ear tips is to be used. As another example, the audio source device 9 may display text indicating which ear tip is to be used during the measurement (e.g., "Please install the blue ear tip."). As yet another example, the audio system 20 may output notification audio (either through speaker 30 of the source device 9 and/or through speaker 22 of the in-ear headphone 4) notifying the user which ear tip is to be used.

At block 43, process 40 proceeds to determine whether the fit parameter is within a threshold from a target fit parameter. For instance, the target fit parameter may be a predefined fit parameter based on the target frequency response (e.g., measured in a controlled setting), as described herein (e.g., the target frequency response 11 of FIG. 1A). In one aspect, the threshold may represent a tolerance level (e.g., within 5%, 10%, 15%, etc.) of the target fit parameter. In another aspect, the process determines whether the fit parameter exceeds the target fit parameter (e.g., by a threshold). If so, the process 40 proceeds to notify the user that the current ear tip is suitable and that the user should use this ear tip with the in-ear headphone 4 (at block 44). In one aspect, the audio system 20 may notify the user in a similar manner to other notifications as described herein. For instance, the in-ear headphone 4 may output notification audio, since the in-ear headphone may still be inserted inside the user's ear. As another example, the audio source device may output a notification, either as notification audio or a visual representation of the notification.

If, however, the fit parameter is not within the threshold from the target fit parameter, the process 40 proceeds to notify (or) inform the user to try a different ear tip (at block 46). Specifically, the system may notify the user to replace the (first) ear tip with a second ear tip in response to the fit parameter associated with a microphone signal used to measure the frequency response being less than the threshold. In one aspect, the threshold may be a previously determined fit parameter associated with another ear tip. In one aspect, the audio source device (and/or in-ear headphone) may inform the user of a specific ear tip (e.g., a blue ear tip). In another aspect, the device(s) may inform the user to try a different ear tip, without specifying exactly which ear tip the user should try. Once the tip has been replaced, the process 40 proceeds back to block 42 to perform the fitting process to determine a fit parameter for the new ear tip.

In one aspect, at decision block 45, the process 40 may optionally determine whether there are any other ear tips with which an ear tip fitting process should be performed. For instance, as described herein, the controller 35 may be executing an ear tip fitting application. The application may include predefined specifications (e.g., description data, data regarding physical characteristics, etc.) for one or more ear tips that are configured to couple to the in-ear headphone 4. Thus, at this point the application may present a menu of ear tips, from which the user of the audio source device may select. In another aspect, the controller 35 may have specifications of ear tips stored therein based on a type of in-ear headphone 4 that is a part of the audio system 20. For instance, the in-ear headphone 4 may include one or more ear tips (e.g., provided in packaging of the in-ear headphone by the manufacturer). Once the in-ear headphone 4 is paired with the audio source device 9, the in-ear headphone 4 may transmit, over the wireless communication link, the specifications of one or more ear tips. In one aspect, the in-ear headphone 4 may transmit identification information regarding the headphone to the source device. The device 9 may then retrieve ear tip specifications from a remote server by transmitting, over a computer network, a request message that includes the identification information of the in-ear headphone. In response, the remote server may transmit ear tip specifications to the source device 9.

In one aspect, if there are ear tips which the audio system 20 has not performed an ear tip fitting process for, the process 40 notifies the user of the audio source device 9 to replace the current ear tip with another ear tip (at block 46). For instance, the in-ear headphone may output an audio signal that includes the speech "Please replace the ear tips with the blue ear tips that were provided by the manufacturer."

If, however, there are no more ear tips for which to perform the fitting process, the process 40 determines which of the determined fit parameters is the highest of the other fit parameters (at block 47). Specifically, the audio system 20 determines whether a fit parameter is less than one or more previously obtained fit parameters that were each a result of a performance of the fitting measurement that was performed to determine whether different ear tips of the in-ear headphone fits properly within the user's ear canal. For example, a previously determined fit parameter may be defined or selected as a (e.g., pre-selected) threshold, to which the system compares another determined fit parameter associated with a currently coupled ear tip. In one aspect, each of the compared fit parameters may be based on differences between respective measured frequency responses and a target frequency response at one or more low-frequency bands and one or more high frequency bands. More about the frequency bands is described herein. In one aspect, the system may compare each previously determined fit parameter to the pre-selected threshold. If one exceeds the threshold, that fit parameter may then be defined as the pre-selected threshold, to which the remainder of the previously determined fit parameters are compared. In one aspect, a fit parameter exceeds a threshold when the parameter is higher than the threshold by at least a tolerance level (e.g., 5%, 10%, 15%, etc.). Once the comparison is complete, the ear tip with the highest fit parameter is selected.

In one aspect, the process 40 may proceed to this step (block 47) after fit parameters for all ear tips (e.g., that were provided by the manufacturer in original packaging of the in-ear headphones 4) were determined, or the process 40 may proceed after two or more fit parameters of a subset of ear tips were determined. In another aspect, the process 40 may proceed based on user input. For instance, upon determining fit parameters for two or more ear tips, the user may select a UI item that is displayed on the audio source device 9 to determine which is the highest.

As described herein, a fit parameter of an ear tip may be determined based on differences between a target frequency response and a measured frequency response. In one aspect, a fit parameter of an optimal ear tip has a higher fit parameter than other fit parameters when at least one difference between that ear tip's measured frequency response and the target frequency response is lower than corresponding differences for other ear tips, as illustrated in FIGS. 1A and 1B. Once determined, the process 40 notifies the user of the audio system 20 to use the ear tip that has the highest fit parameter (at block 48). For instance, referring to FIG. 1B, the audio system 20 may notify the user 3 to use the second ear tip 12. In one aspect, when the current ear tip's fit parameter is lower than a previously determined fit parameter (e.g., a pre-selected threshold), the audio system may notify the user that the current ear tip does not properly fit within the user's ear canal and/or may notify the user to replace the current tip with another tip that was previously measured. For instance, the audio system 20 may drive the speaker 22 with an audio signal containing speech instructions for the user to replace the current ear tip with a previously measured ear tip. As another example, the audio system 20 may cause the display screen 33 of the audio source device 9 to display visual instructions, which may include text, images, and/or video, for the user to replace the current ear tip.

In one aspect, the fitting process may span a period of time (e.g., one second, two seconds, five seconds, etc.). The period of time may be based on several factors, such as the time it takes to establish the second wireless connection and the time for the in-ear headphone to determine the fit parameter (e.g., measure the frequency response, etc.). During this period of time, the (e.g., controller 26 of the) in-ear headphone may dedicate at least some operational capabilities to the process, thereby preventing the headphone from performing other tasks. For instance, during the process the in-ear headphones may be unable to obtain a different audio signal for output through the speaker 22. In some cases, however, the in-ear headphone 4 may be required to perform these other tasks in lieu of the fitting process. Therefore, in some instances the fitting process must be terminated (or suspended) while these other higher priority tasks are performed.

Some aspects perform variations of the process 40 described in FIG. 3. In one aspect, at least some of the operations of the process 40 may be performed by a machine learning algorithm that is configured to determine whether an ear tip is best suited for a user. In another aspect, the machine learning algorithm may include one or more neural networks (e.g., convolution neural networks, recurrent neural networks, etc.) that are configured to obtain a fit parameter for an ear tip and determine whether the ear tip is best suited (or most optimal) for a particular user.

Figure 4:
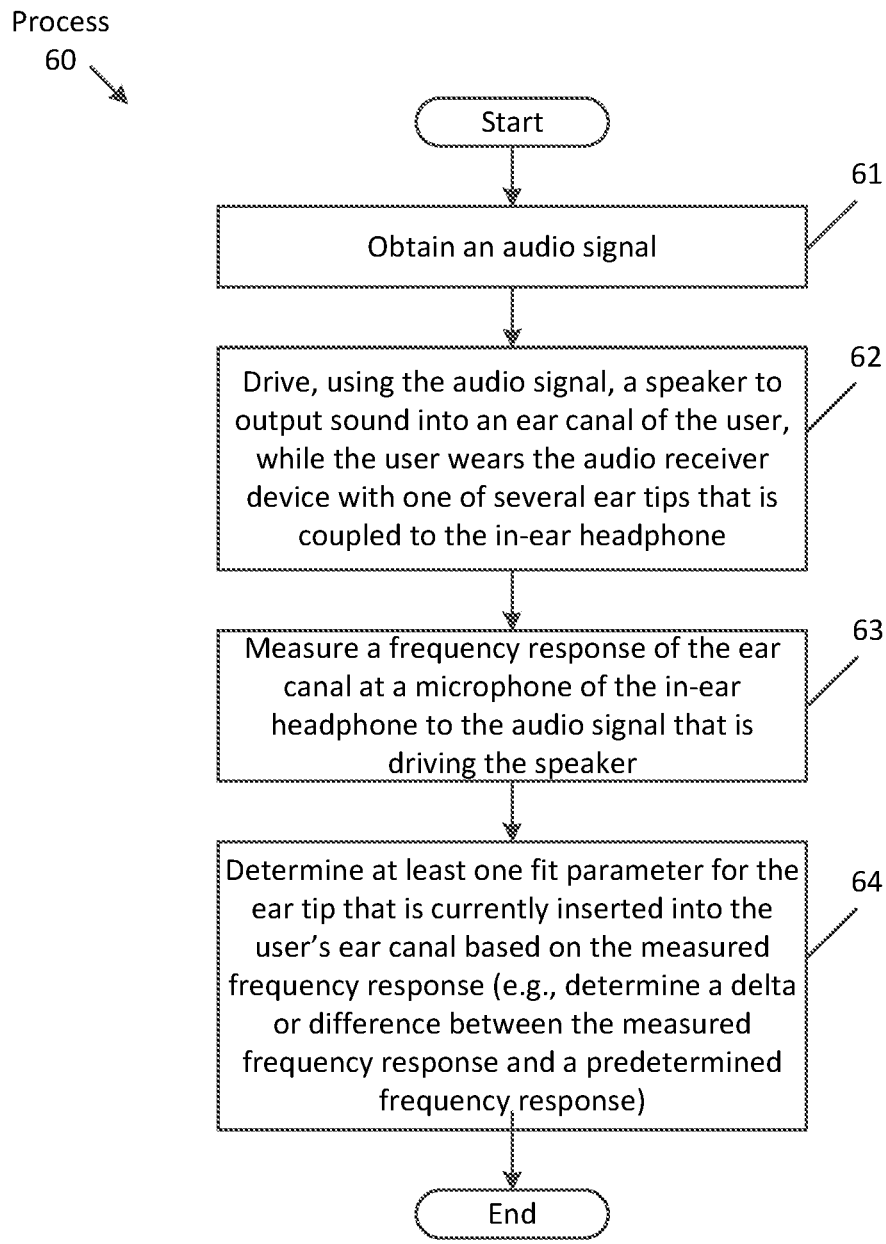
FIG. 4 is a flowchart of one aspect of a process to perform an ear tip measurement.

FIG. 4 is a flowchart of one aspect of a process 60 for performing a fitting measurement. Process 60 may be the same and/or substantially similar to block 42 of FIG. 3 and/or block 54 of FIG. 5. In some aspects, at least some of the operations described in process 60 may be performed by the in-ear headphone 4 and/or the audio source device 9, as described herein. The process 60 begins by obtaining the audio signal that is being transmitted (or streamed) from the audio source device 9 (at block 61). For instance, the in-ear headphone may obtain the audio signal via a wireless communication link. In another aspect, the in-ear headphone may obtain the audio signal via local memory. Using the obtained audio signal, the process 60 drives the speaker 22 to output sound into an ear canal of the user while the user wears the in-ear headphone with an ear tip coupled to the headphone 4 (at block 62). For instance, referring the FIG. 1A, the ear tip may be the first ear tip 5. In one aspect, the in-ear headphone may wait a period of time before driving the speaker 22. As described herein, the audio source device may wait a period of time before transmitting the request to start the fitting process in order to allow the in-ear headphone to settle into the user's ear. In addition to or in lieu of the audio source device 8 waiting the period of time, the in-ear headphone may wait for the period of time before driving the speaker 22. In one aspect, the in-ear headphone 4 may wait when the indication that is obtained by the audio source device 9 (at block 51 of FIG. 5) is based on detecting an in-ear presence of the in-ear headphone (e.g., proximity data).

The process 60 measures a frequency response of the ear canal at the internal microphone 23 to the audio signal that is driving the speaker 22 (at block 63). Specifically, the internal microphone 23, responsive to the sound output by the speaker 22, captures a microphone signal. The in-ear headphone 4 processes the microphone signal to measure the frequency response of the ear canal.

The process 60 determines (or computes) at least a first fitting parameter (or fit parameter) for the ear tip that is currently inserted into the user's ear canal based on the measured frequency response (at block 64). In one aspect, the first fitting parameter may be a fit parameter that the controller 26 determines based on a difference (or delta) between a target frequency response and the measured frequency response, as described herein. Specifically, the controller 26 may base the fit parameter on an intensity (or energy) difference between the two responses for at least one frequency band, such as a low frequency band (e.g., less than 1000 Hz). Once the difference is determined, the controller 26 may perform a table lookup into a data structure (stored within the controller 26) that associates deltas (with respect to this given target response) with fit parameters. In one aspect, the difference may be a difference in spectral density between the two responses at the at least one frequency band.

In one aspect, the fit parameter may be a numerical value (e.g., 30). In another aspect, the greater the difference between the target response and the measured response, the lower the fit parameter. For instance, a greater difference (e.g., the more separated both responses are from one another) may result in a lower value, such as 30 out of 100. While a lower difference may result in a higher, more favorable value, such as 80 out of 100. More about the differences between a more favorable fit parameter and a less favorable fit parameter is described with reference to FIG. 3.

In one aspect, the fit parameter may be based on differences between the target response and the measured response for different frequency bands. For instance, the fit parameter may be based on differences for a low-frequency band and a high-frequency band, as described herein. In this case, the high-frequency band may be equal to or greater than 1000 Hz. In one aspect, the high-frequency band may be a band within 1000 Hz (e.g., 1000 Hz to 1200 Hz, etc.). Similar to the previous computation, the controller 26 may perform a table lookup based on the two or more differences. In one aspect, the fit parameter may be an array of values, each value being based on a corresponding difference.

In one aspect, the in-ear headphone 4 may determine which portions of the microphone signal are to be processed to measure the frequency response, based on the audio signal that is driving the speaker 22. For instance, as described herein, the in-ear headphone 4 may determine the fit parameter based on differences between the measured frequency response and a target frequency response at one or more frequency bands. To ensure a successful measurement, the in-ear headphone 4 may process the audio signal to determine whether energy levels (or the spectral density) of portions (e.g., each frame, every other frame, etc.) of the audio signal at the corresponding one or more frequency bands is above a threshold level. Specifically, the controller 26 may monitor energy levels of spectral content of the audio signal to determine whether an energy level at a frequency (or frequency band) is above the threshold. If the energy level is above the threshold, the controller 26 may process the audio signal to measure the frequency response of the ear canal.

If, however, the energy level is below a threshold, the in-ear headphone 4 may continue to drive the speaker 22 with the audio signal and wait to measure the frequency response until a future portion of the audio signal is obtained that contains spectral content having an energy level that exceeds the threshold. Specifically, the controller 26 may process the audio signal until such conditions are met. In some aspects, when the audio signal is a test audio signal, the one or more frequency bands may have sufficient energy levels. If, however, the audio signal is user-desired content (e.g., music), the in-ear headphone 4 may playback the music and wait to measure the frequency response until the energy levels exceed the threshold.

As described herein, to perform process 40 of FIG. 3, the in-ear headphone 4 is configured to obtain an audio signal from the audio source device 9 over a BLUETOOTH link and use the audio signal to measure a frequency response of the user's ear canal. Thus, in order for the in-ear headphone 4 (or controller 26) to use the audio signal to perform a measurement, the audio source device 9 can instruct the in-ear headphone 4 to start the fitting process. In one aspect, the audio source device 9 instructs the headphone 4 before the audio signal is streamed to the headphone 4. Conventional wireless standards, however, are unable to provide such an instruction. Instead, when a source device streams audio data to a receiver (or sink) device over a wireless communication link, such as BLUETOOTH, the receiver device is only configured to playback the audio data without any instruction regarding why (or for what) the audio data is being played back. Specifically, when streaming audio data via a wireless connection that uses an audio distribution profile (e.g., BLUETOOTH Advanced Audio Distribution Profile (A2DP)), the receiver device does not know the purpose of the playback (e.g., whether the playback is for performing an ear tip measurement). Rather, the A2DP profile defines protocols and procedures for the distribution and playback of audio data via Asynchronous Connection-Less (ACL) channels without any additional information.

To overcome this deficiency, the present disclosure describes a method for establishing two wireless connections over a communication link between an audio source device and an in-ear headphone, each connection using a different wireless profile. For one of the connections, data that instructs the in-ear headphone to start the process is formatted according to one profile, while another connection is used to distribute (or stream) an audio signal to the in-ear headphone for use during the fitting process, according to another profile. Such a method enables the audio source device to instruct the in-ear headphone to use an audio signal that is to be streamed to the headphone for a fitting process.

Figure 5:
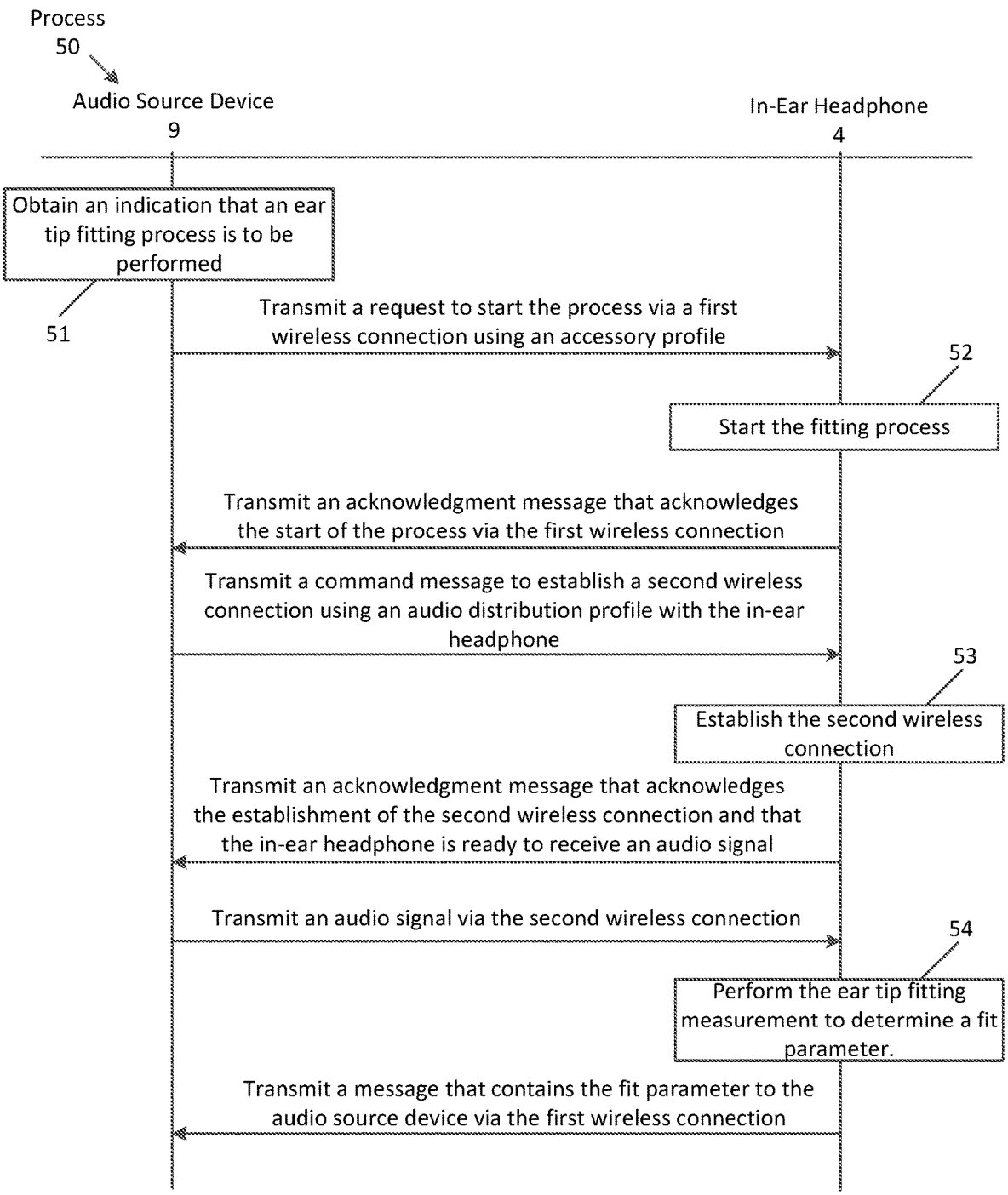
FIG. 5 is a signal diagram of one aspect of a process to set up and perform the fitting process.

FIG. 5 is a block diagram of a process 50 to set up and perform the fitting process, as described at block 42 of FIG. 3. As illustrated, operations of this process 50 are performed by the audio system 20 (e.g., either the audio source device 9 and/or the in-ear headphone 4). In one aspect, to set up the fitting process, the audio source device 9 establishes two wireless connections over a communication link, where one of the connections is for instructing the in-ear headphone 4 that the fitting process is to be performed and another is for transmitting an audio signal to the headphone for use during the fitting process.

The process 50 begins by the audio source device 9 obtaining an indication that an ear-tip fitting process is to be performed (at block 51). For instance, (the controller 35 of) the source device 9 may be executing an ear-tip fitting application, as described herein. The application may display a UI item to initiate the fitting process on the display screen 33 of the source device 9.

When the UI item is selected by the user (e.g., a tap gesture on the display screen 33), the controller 35 may obtain the indication. In one aspect, the indication may be a notification that the in-ear headphone 4 is being used by the user, and therefore is ready to be instructed to start the process. For example, the controller 26 of the in-ear headphone 4 may be configured to perform an in-ear presence function in which the controller 26 determines whether or not the in-ear headphone 4 is being used by the user (or is inserted into the user's ear). Such a determination may be based on sensor data obtained by one or more sensors. For instance, the in-ear headphone 4 may include a proximity sensor that produces sensor data that indicates a distance from the headphone 4 to an object. The controller 26 obtains the sensor data and determines whether the distance is below a threshold (e.g., one inch). When the distance is below the threshold, it may be determined that the user is placing the headphone 4 against the user's head (or ear). In one aspect, this determination may be based on a rate of change of the distance and/or based on whether the distance is below the threshold for a period of time (e.g., 10 seconds). Once the controller 26 determines that the in-ear headphone 4 is being used, the network interface 27 transmits the notification over the wireless communication link to the audio source device 9. In another aspect, once the controller 26 determines that the in-ear headphone is in a use state, the controller 26 may instruct the network interface 27 to establish the wireless communication link with the audio source device 9, if the link had not already been established.

In some aspects, the determination that the in-ear headphone 4 is in use may be based on a detected pressure change by an air-pressure sensor that is inserted along with the ear tip, into the ear canal of the user. The air-pressure sensor produces an air pressure signal that indicates the air pressure within the ear canal as the headphone (or ear tip) is being inserted into the ear of the user. During and after insertion, the air-pressure sensor detects changes in the air pressure within the ear canal, with respect to ambient atmospheric pressure. These changes are caused by the tip of the earphone when it creates a seal within the ear canal and compresses the volume of air while the earphone is being inserted into the ear. The earphone processes the air pressure signal to detect changes in the air pressure, such as pulses that are indicative of the user inserting the headphone into the user's ear canal. In some aspects, the air-pressure sensor may be a standalone air-pressure sensor. In other aspects, the air-pressure sensor may be a microphone such as the internal microphone 23 since a microphone produces a microphone signal based on changes in air pressure.

In some aspects, the indication may be obtained in response to a media playback application (which is being executed by the controller 35 of the audio source device 9) requesting playback of user-desired audio content (e.g., music). For instance, the user of the audio source device 9 may initiate playback of the audio content through user input (e.g., through a selection of a UI item that is displayed on the display screen 33 of the source device). The application may obtain the user input and in response request playback. As described herein, the in-ear headphone 4 may use the user-desired audio content to determine the ear tip's fit parameter. In one aspect, the indication may be periodically (e.g., automatically) obtained by the controller 35 of the audio source device 9 during playback of user-desired content. This may allow the fitting process to be performed in the background (e.g., without the user knowing until the system determines that the ear tip needs to be replaced based on the determined fit parameter).

The audio source device 9 transmits a (first) request to start the fitting process over the BLUETOOTH link and via a first wireless connection (or communication channel) using an accessory profile. In one aspect, the audio source device 9 may transmit the request in response to obtaining the indication at block 51. In another aspect, the audio source device 9 may wait a period of time (e.g., one second) after obtaining the indication to transmit the request. Specifically, in the case in which the indication is associated with detecting that the in-ear headphone has been inserted into the user's ear, the audio source device 9 may wait until the headphone has settled before transmitting the request. In one aspect, the accessory profile may include parameters (or protocols) and procedures for transmitting (e.g., request) data from the audio source device 9 to the in-ear headphone 4. In one aspect, if the first wireless connection is not already established, the audio source device 9 may establish the first wireless connection in response to obtaining the indication. Thus, the first wireless connection may be established before a second wireless connection that is to be used for audio distribution, as described herein. In some aspects, the accessory profile is a profile for configuring accessory devices, such as in-ear headphones to perform certain actions. For instance, the accessory profile may allow the audio source device 9 to reconfigure identification information for the in-ear headphone 4 and/or allow the device 9 to instruct the in-ear headphone to perform operations, such as the fitting process. In one aspect, the accessory profile may be a BLUETOOTH Serial Port Profile (SPP).

Upon obtaining the request, the in-ear headphone 4 starts the fitting process (at block 52). Specifically, upon obtaining the request (from the network interface 27) the controller 26 performs one or more operations in anticipation of receipt of an audio signal. For instance, the controller 26 may activate the internal microphone 23 in order to obtain a microphone signal produced by the microphone. As another example, the controller 26 may begin performing digital signal processing operations and/or begin executing at least one application (e.g., a media playing application, etc.) that will process and/or output the audio signal.

As yet another example, the controller 26 may use the request to determine whether present conditions would allow a successful fitting measurement. For instance, since the measurement of the frequency response may be susceptible to ambient noise, the controller 26 may determine whether noise within the ear canal (with respect to ambient noise from the environment) of the user is below a threshold (e.g., whether a signal-to-noise (SNR) ratio of the microphone signal produced by the internal microphone 23 is above a threshold). If not, conditions may be adequate to perform the measurement.

After starting the process, the in-ear headphone 4 transmits an acknowledgement message that acknowledges the request has been received and that the process has started (or is to start) via the first wireless connection, to the audio source device 9. In one aspect, the headphone 4 may wait to transmit the acknowledgment message until conditions are favorable for performing the measurement (e.g., waiting until the SNR is above the threshold), as described above. Upon receipt of the acknowledgement message, the audio source device 9 transmits a command message to establish a second wireless connection using the audio distribution profile to the in-ear headphone 9. In one aspect, the audio distribution profile may be the BLUETOOTH A2DP, as described herein. In another aspect, the second wireless connection may use any profile that may format audio data for transmission over the BLUETOOTH communication link. In one aspect, the audio source device 9 may wait until the acknowledgement message is received, before transmitting the command message to establish the second wireless connection.

The in-ear headphone 4 establishes, over the wireless communication link, the second wireless connection with the audio source device 9 (at block 53). For instance, the in-ear headphone 4 may communicate with the audio source device in order to configure the BLUETOOTH stack that is executing within the in-ear headphone to receive the audio signal via the second wireless connection (e.g., negotiating the codec for decoding the audio signal that is transmitted from the audio source device, etc.). Once established, the in-ear headphone 4 transmits an acknowledgement message that acknowledges the establishment of the second wireless connection and that the in-ear headphone is ready to receive (or stream) an audio signal. Once received, the audio source device 9 transmits (or streams) an audio signal to the in-ear headphone 4 via the second wireless connection. In one aspect, the audio source device 9 may wait to transmit the audio signal until the acknowledgement message is received that acknowledges the in-ear headphone is ready to receive the audio signal. In one aspect, the audio signal may be a predefined test audio signal that contains test sound. In another aspect, the audio signal may contain user-desired audio sound, such as music. In yet another aspect, the audio signal may be system generated audio signal that is also used for another purpose (e.g., an in-ear detect tone or chime). More about the audio signal is described herein.

As described herein, the in-ear headphone 4 performs the ear tip fitting measurement to determine a fit parameter (at block 54). Specifically, the in-ear headphone obtains the audio signal via the second wireless connection and may use the audio signal to drive the speaker 22 to output sound into an ear canal of the user. Responsive to the outputted sound, the in-ear headphone 4 determines the fit parameter. For instance, the in-ear headphone measures a frequency response of the ear canal using the outputted sound. The in-ear headphone determines the fit parameter based on the measured frequency response, as described herein, and upon determining the fit parameter, the in-ear headphone transmits a message to the audio source device 9 that contains the fit parameter via the first wireless connection.

Figure 6:
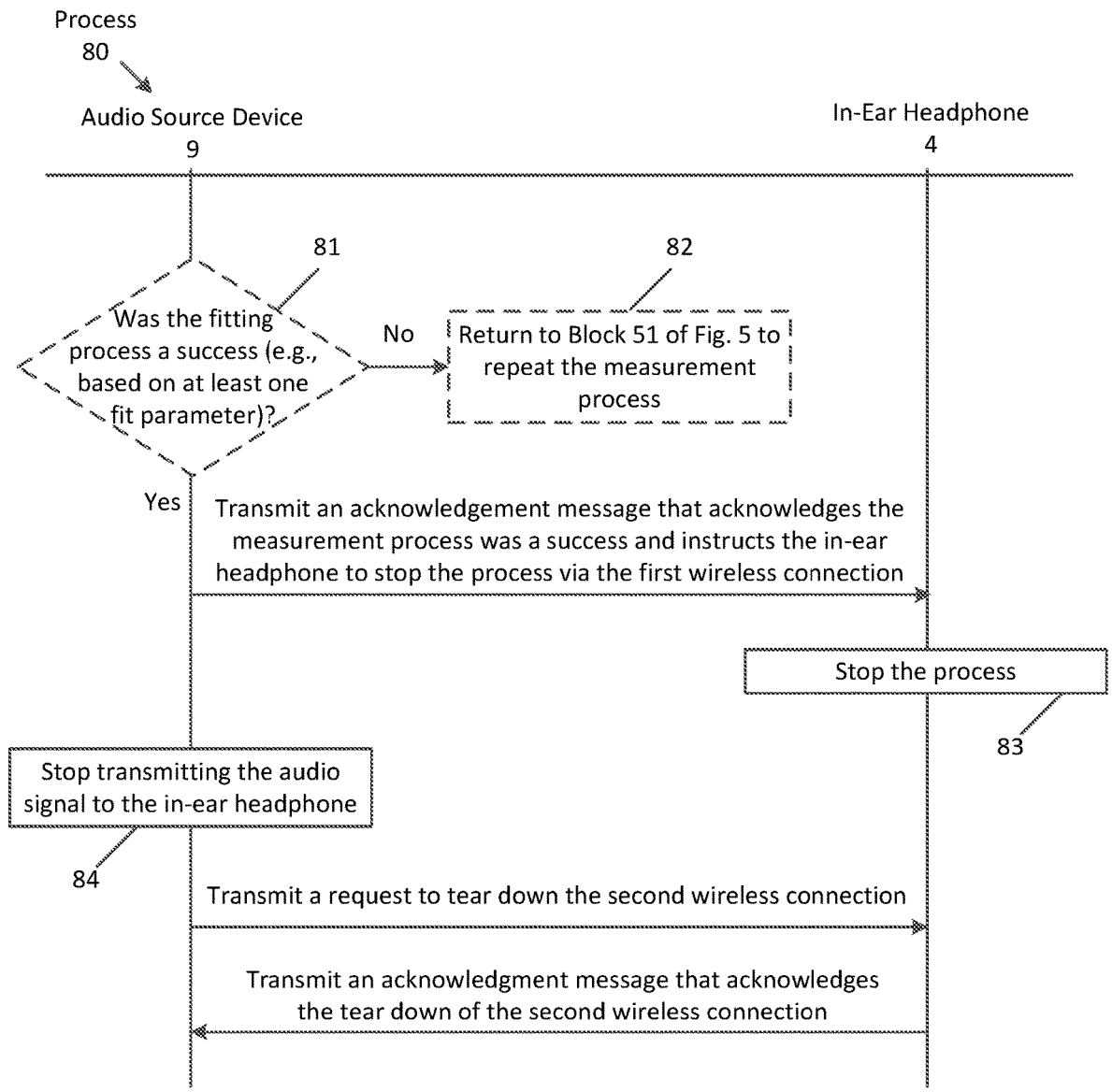
FIG. 6 is a signal diagram of one aspect of a process to determine whether to stop the fitting process.

In one aspect, the measurement may be susceptible to ambient noise, and therefore if there is a significant amount of ambient noise the measurement may be inaccurate. Thus, the audio system 20 may determine whether or not to stop the fitting process based on ambient conditions. FIG. 6 illustrates a signal diagram of one aspect of a process 80 to determine whether to stop the fitting process based on the fit parameter. In one aspect, the process 80 may be performed after the audio source device 9 obtains the fit parameter from the in-ear headphone 4, as described in FIGS. 4 and 5.

The process 80 begins by the audio source device 9 determining whether the fitting process was a success or a failure, based on the fit parameter (at decision block 81). For instance, a "successful" fitting process may be determined based on whether the fit parameter is within an expected range (e.g., between 20 and 100). A "failure" of the process, on the other hand may result when the fit parameter is determined to be out of that range or a very low (or high) fit parameter (e.g., 1 out of 100). In one aspect, the rather than transmitting a fit parameter, the in-ear headphone 4 may transmit, via the first wireless connection, a failure message. In one aspect, the failure message may indicate that the in-ear headphone was unable to determine a useful fit parameter (or was unable to determine a fit parameter entirely).

In one aspect, a failed fitting process may be based on ambient noise within the environment that interferes with the measurement of the frequency response. In order to mitigate ambient noise, the in-ear headphone 4 may perform an ANC function, in which the controller 26 using a reference microphone signal from the external microphone 21 and/or an error microphone signal from the internal microphone 23 to compute an anti-noise signal that is outputted through the speaker 22 in order to reduce the ambient noise that leaks into the user's ear canal, as described herein. While performing the ANC function, the controller 26 may periodically adapt (e.g., filter coefficients of) the ANC function (e.g., every 1 to 100 milliseconds), according to the level or amount of ambient noise contained within the reference microphone signal.

In some cases, however, the ANC function may freeze, which means that the ANC filter coefficients remain unchanged for one or more periods of time. The ANC function may freeze for a variety of reasons. For example, this may occur due to instability in the audio system. For instance, wind noise may include a significant amount of low-frequency content. Wind noise interfering with the frequency response may result in a high sporadic energy spikes in a low-frequency range, which may cause the ANC function to freeze.

When the ANC function freezes, a high amount of ambient noise contained within the reference microphone signal (e.g., above a threshold amount) may result. If the ANC function freezes during the measurement of the frequency response for a certain amount of time, it may cause the fitting process to fail. For instance, if the measurement occurs for one second, and the ANC function freezes for a threshold of that time (e.g., 0.5 seconds or 50% of the time), the audio system may determine that the measurement is a failure, since a significant amount of ambient noise that may cause the instability in the system may also interfere with the measurement. If the audio system determines that the ANC function freezes during at least a portion of the measurement, the audio system 20 may determine that the measurement is a failure.

If the fitting process is determined to be a failure (or not a success), the process 80 returns to block 51 of FIG. 5 to restart the fitting process (at block 82). In one aspect, the process 80 may repeat until the fitting process is a success, or it may repeat a certain number of times until the audio system notifies the user that the process cannot be performed properly at this time.

If, however, the fitting process was a success, the audio source device 9 transmits an acknowledgement message, via the first wireless connection, which acknowledges the process was a success and instructs the in-ear headphone 4 to stop the process. In response, the in-ear headphone 4 stops the process (at block 83). For example, the in-ear headphone 4 may deactivate the internal microphone 23 and/or the controller 26 may cease performing operations (or functions) associated with the ear tip measurement. The audio source device 9 also stops transmitting the audio signal to the in-ear headphone, via the second wireless connection (at block 84). In one aspect, the audio source device 9 may stop transmitting the audio signal before, after, or contemporaneously with the transmission of the acknowledgment message. In another aspect, the audio source device 9 may stop transmitting the audio signal in response to receiving an acknowledgment message from the in-ear headphone, via the first wireless connection, acknowledging that the in-ear headphone 4 has stopped the process (e.g., after block 83). In one aspect, the fitting process is stopped by the in-ear headphone 4 stopping to obtain the audio signal from the audio source device.

The audio source device 9 then transmits a request to tear down the second wireless connection. In one aspect, this request may be transmitted via the first or second wireless connection. In response, the in-ear headphone 4 tears down (or terminates) the second wireless connection and transmits an acknowledgement message back to the audio source device 9 that acknowledges the tear down of the second wireless connection. In one aspect, the in-ear headphone 4 may also tear down the first wireless connection.

Thus, with the tear down of the second wireless connection, the audio system 20 returns to the state from before the audio source device had obtained the indication at block 51 of FIG. 5. Some aspects perform variations of the process 80 described in FIG. 6. In one variation, the operations performed at decision block 81 may be performed after the audio source device 9 obtains the acknowledgment message that the second wireless connection has been torn down (at the end of process 80). In this case, if the fitting process was not a success, the process would proceed to block 51 of FIG. 5 to repeat the operations of process 50. If otherwise, the process 80 would end.

Figure 7:
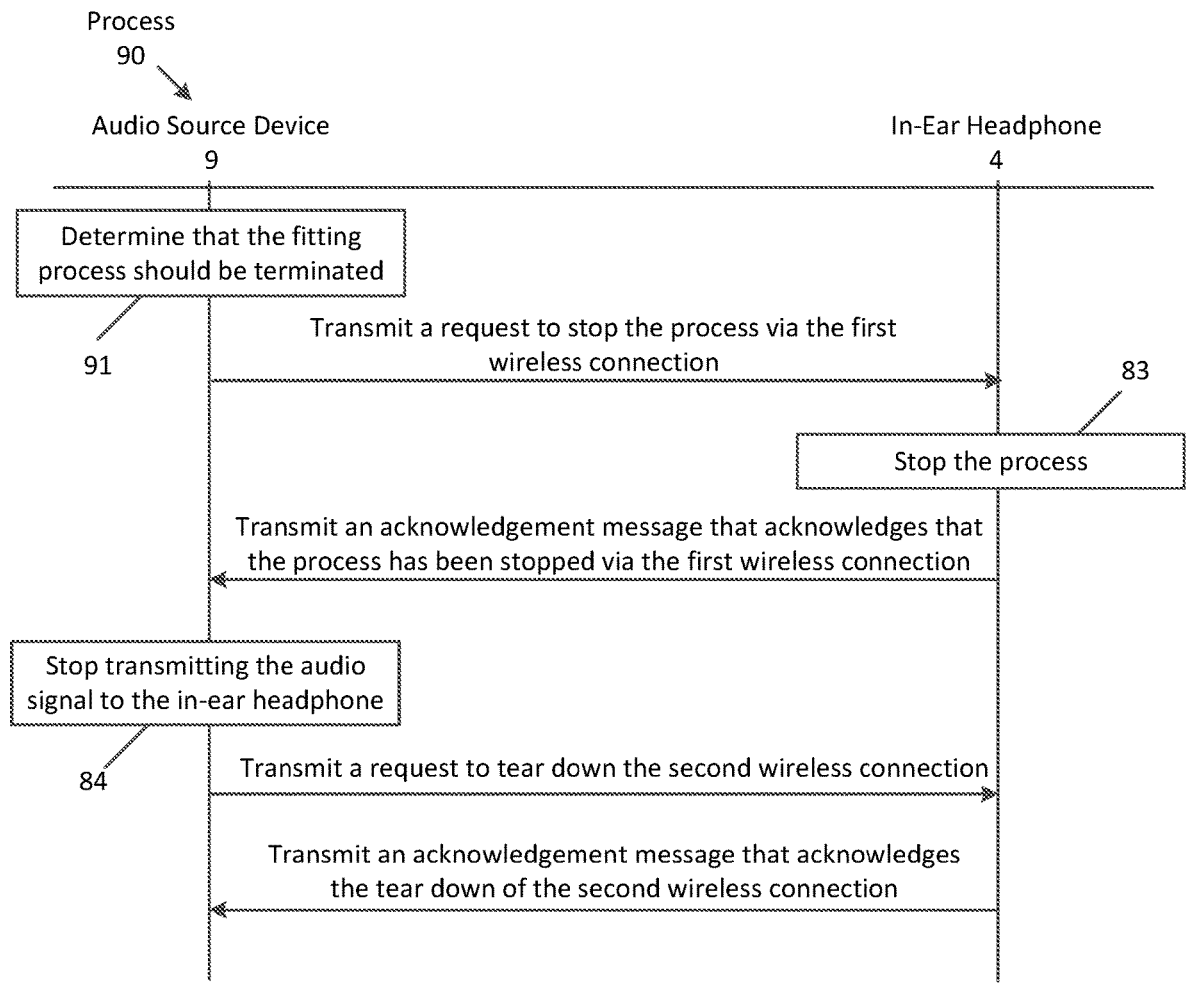
FIG. 7 is a signal diagram of one aspect of a process to terminate the fitting process.

FIG. 7 is a signal diagram of one aspect of a process 90 to terminate the fitting process. Specifically, this process 90 may be performed after the in-ear headphone 4 has started the process at block 52 of FIG. 5 and/or before the process is stopped at block 83 of FIG. 6. In one aspect, this process 90 may be performed at any time. In one aspect, the operations described in process 90 may be performed by the audio source device 9 and/or the in-ear headphone 4 of the audio system 20. The process 90 begins by the audio source device 9 determining that the fitting process should be terminated (at block 91). In one aspect, the determination may be based on user input. For instance, the user of the audio source device 9 may select a UI item (that is displayed on the device's display screen 33), which when selected instructs the controller 35 (or the application) to terminate the process. As another example, the user input may be based on a voice command (e.g., contained within a microphone signal of an external microphone and detected by a speech recognition function of the controller 35).

In another aspect, the determination may be based on a request by another application that is executing within the audio source device 9 (by the controller 35) to stream a different audio signal to the in-ear headphone for playback instead of the audio signal that is to be used for the measurement. For instance, a telephony application may identify that an incoming call is being received by the audio source device 9 (e.g., through an indication obtained by the network interface 27). Upon identifying the incoming call, the telephony application may request the controller 35 to output (e.g., a ring tone signal and/or a downlink signal of) the incoming call through the speaker 22 of the in-ear headphone. In one aspect, the determination to stream the different audio signal may be based on the different audio signal having a higher (output) priority. The controller may determine which audio signal (or process) has a higher priority. In one aspect, the controller may perform a table lookup into a data structure that associates media playback requests (and/or the application that is requesting playback) with a priority value. Since an incoming call may have higher priority than the fitting process, the controller 35 may terminate the process in order to output the incoming call.

In some aspects, the determination may be based on the ongoing fitting process being performed by the in-ear headphone 4 (and/or the audio source device 9). For instance, the process may time out (e.g., exceed a threshold time), and therefore rather than have the process continue to run (possibly for an inordinate period of time), the audio source device 9 determines to terminate the process.

Thus, in response to determining that the process is to be terminated, the audio source device 9 transmits a (second) request to the in-ear headphone 4 to stop the process via the first wireless connection. The in-ear headphone stops the process at block 83, responsive to the request, and as described herein. The in-ear headphone 4 transmits an acknowledgment message to the audio source device 9 that acknowledges that the process has been stopped, via the first wireless connection. Once received, the audio source device 9 stops transmitting the audio signal to the in-ear headphone 4 at block 84, and transmits a request to tear down the second wireless connection, as described in FIG. 6.

In one aspect, the audio system may perform the fitting process upon determining that the playback of the different audio signal is complete. Continuing with the previous example, after the incoming call has been terminated (e.g., via a user selection of a UI item presented on the source device 9 for ending the call), the audio system performs the process 50 of FIG. 5. For instance, the ending of the call may be the indication that the ear tip fitting process is to be performed at block 51.

Some aspects may perform variations to the processes described herein. For example, the specific operations of at least some of the processes may not be performed in the exact order shown and described. The specific operations may not be performed in one continuous series of operations and different specific operations may be performed in different aspects. For instance, rather than the audio source device 9 determine that the fitting process should be terminated in process 90, the in-ear headphone 4 may make such a determination. For instance, the in-ear headphone may detect that the user is taking the in-ear headphone off (e.g., based on proximity sensor data). As a result, the in-ear headphone 4 may stop the process and transmit the acknowledgement message that the process has been stopped.

In one aspect, at least some of the operations described herein are operational operations that may or may not be performed. Specifically, blocks that are illustrated as having dashed or dotted boundaries may optionally be performed. In another aspect, other operations described in relation to other blocks may be optional as well.

As described herein, one aspect of the present technology is the gathering and use of data available from specific and legitimate sources to automatically select the most optimal ear tip for an in-ear headphone. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to efficiently select an optimal ear tip over time. In particular, determined fit parameters for ear tips may be associated with a user via the user's personal information data (e.g., the user's name), and stored in (e.g., memory of) the in-ear headphone. As a result, when performing future ear tip selection measurements for the user to determine future fit parameters for other ear tips, the headphone may retrieve the user's previously determined fit parameters to compare them with the future fit parameters in order to select the optimal ear tip.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide certain data, such as the user's name. In yet another example, users can select to limit the length of time this data is maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services As previously explained, an aspect of the disclosure may be a non-transitory machine-readable medium (such as microelectronic memory) having stored thereon instructions, which program one or more data processing components (generically referred to here as a "processor") to perform the network operations, signal processing operations, audio signal processing operations, and ear tip selection fitting process operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a programmed processor of an audio source device, the method comprising:
    a) transmitting, over a wireless BLUETOOTH link and via a BLUETOOTH Serial Port Profile (SPP) wireless connection, a request to start a fitting process to an in-ear headphone, wherein the fitting process determines whether an ear tip of the in-ear headphone fits properly within an ear canal of a user;
    b) obtaining, over the wireless BLUETOOTH link and via the BLUETOOTH SPP wireless connection, an acknowledgement message from the in-ear headphone that acknowledges the request has been received and that the in-ear headphone has started the fitting process;
    c) in response to obtaining the acknowledgement message and while the in-ear headphone and the audio source device are wirelessly connected via the BLUETOOTH SPP wireless connection,
        establishing, over the wireless BLUETOOTH link, a BLUETOOTH Advanced Audio Distribution Profile (A2DP) wireless connection between the in-ear headphone and the audio source device, and
        transmitting, over the wireless BLUETOOTH link and via the BLUETOOTH A2DP wireless connection, an audio signal to be used by the in-ear headphone to perform a measurement; and
    d) obtaining, over the wireless BLUETOOTH link and via the BLUETOOTH SPP wireless connection, a fit parameter that is a result of the measurement from the in-ear headphone.

2. The method of claim 1 further comprising:
    determining whether the fit parameter is less than a set of previously obtained fit parameters that were each a result of a performance of the measurement; and
    in response to determining that the fit parameter is below the set of previously obtained fit parameters, notifying the user of the in-ear headphone that the ear tip does not properly fit within the ear canal of the user.

3. The method of claim 2, wherein the audio source device comprises a display, wherein notifying the user comprises displaying a notification on the display that indicates that the ear tip does not properly fit or to instruct the user to replace the ear tip with a different ear tip.

4. The method of claim 1 further comprising, in response to obtaining the acknowledgement message, transmitting a command message to establish the BLUETOOTH A2DP wireless connection with the in-ear headphone, wherein the audio signal is transmitted to the in-ear headphone upon obtaining an acknowledgement message from the in-ear headphone that the BLUETOOTH A2DP wireless connection has been established.

5. The method of claim 1 further comprising determining whether the fit parameter is indicative of the fitting process performed by the in-ear headphone being a success or a failure.

6. The method of claim 5, wherein, in response to the fit parameter being a success, the method further comprises 1) stopping transmission of the audio signal and 2) transmitting a request to the in-ear headphone to tear down the BLUETOOTH A2DP wireless connection.

7. The method of claim 5, wherein, in response to the fit parameter being a failure, the method further comprises performing operations a)-d) in order to determine whether another fit parameter will be a success or a failure.

8. An electronic device comprising:
   at least one processor; and
   memory having stored therein instructions which when executed by the at least one processor causes the electronic device to:
   a) transmit, over a wireless BLUETOOTH link and via a BLUETOOTH Serial Port Profile (SPP) wireless connection, a request to start a fitting process to an in-ear headphone, wherein the fitting process determines whether an ear tip of the in-ear headphone fits properly within an ear canal of a user;
   b) obtain, over the wireless BLUETOOTH link and via the BLUETOOTH SPP wireless connection, an acknowledgement message from the in-ear headphone that acknowledges the request has been received and that the in-ear headphone has started the fitting process;
   c) in response to obtaining the acknowledgement message and while the in-ear headphone and the electronic device are wirelessly connected via the BLUETOOTH SPP wireless connection,
      establish, over the wireless BLUETOOTH link, a BLUETOOTH Advanced Audio Distribution Profile (A2DP) wireless connection between the in-ear headphone and the electronic device, and
      transmit, over the wireless BLUETOOTH link and via the BLUETOOTH A2DP wireless connection, an audio signal to be used by the in-ear headphone to perform a measurement; and
   d) obtain, over the wireless BLUETOOTH link and via the BLUETOOTH SPP wireless connection, a fit parameter that is a result of the measurement from the in-ear headphone.

9. The electronic device of claim 8, wherein the memory has further instructions to:
   determine whether the fit parameter is less than a set of previously obtained fit parameters that were each a result of a performance of the measurement; and
   in response to determining that the fit parameter is below the set of previously obtained fit parameters, notify the user of the in-ear headphone that the ear tip does not properly fit within the ear canal of the user.

10. The electronic device of claim 8 comprises one of a smart phone, a desktop computer, a laptop computer, or a smart watch.

11. The electronic device of claim 8, wherein the memory has further instructions to, in response to obtaining the acknowledgement message, transmit a command message to establish the BLUETOOTH A2DP wireless connection with the in-ear headphone, wherein the audio signal is transmitted to the in-ear headphone upon obtaining an acknowledgement message from the in-ear headphone that the BLUETOOTH A2DP wireless connection has been established.

12. The electronic device of claim 8, wherein the memory has further instructions to determine whether the fit parameter is indicative of the fitting process performed by the in-ear headphone being a success or a failure.

13. The electronic device of claim 12, wherein the memory has further instructions to, in response to the fit parameter being a success, 1) stop transmission of the audio signal and 2) transmit a request to the in-ear headphone to tear down the BLUETOOTH A2DP wireless connection.

14. The electronic device of claim 12, wherein, in response to the fit parameter being a failure, the memory has further instructions to perform operations a)-d) in order to determine whether another fit parameter will be a success or a failure.

15. A processor of an electronic device that is configured to:
   transmit, over a wireless BLUETOOTH link and via a BLUETOOTH Serial Port Profile (SPP) wireless connection, a request to start a fitting process to an in-ear headphone, wherein the fitting process determines whether an ear tip of the in-ear headphone fits properly within an ear canal of a user;
   obtain, over the wireless BLUETOOTH link and via the BLUETOOTH SPP wireless connection, an acknowledgement message from the in-ear headphone that acknowledges the request has been received and that the in-ear headphone has started the fitting process;
   in response to obtaining the acknowledgement message and while the in-ear headphone and the electronic device are wirelessly connected via the BLUETOOTH SPP wireless connection,
      establish, over the wireless BLUETOOTH link, a BLUETOOTH Advanced Audio Distribution Profile (A2DP) wireless connection between the in-ear headphone and the electronic device, and
      transmit, over the wireless BLUETOOTH link and via the BLUETOOTH A2DP wireless connection, an audio signal to be used by the in-ear headphone to perform a measurement; and
   obtain, over the wireless BLUETOOTH link and via the BLUETOOTH SPP wireless connection, a fit parameter that is a result of the measurement from the in-ear headphone.

16. The processor of claim 15 is further configured to:
   determine whether the fit parameter is less than a set of previously obtained fit parameters that were each a result of a performance of the measurement; and
   in response to determining that the fit parameter is below the set of previously obtained fit parameters, notify the user of the in-ear headphone that the ear tip does not properly fit within the ear canal of the user.

17. The processor of claim 16, wherein the electronic device comprises a display, wherein notifying the user comprises displaying a notification on the display that indicates that the ear tip does not properly fit or to instruct the user to replace the ear tip with a different ear tip.

18. The processor of claim 15 is further configured to, in response to obtaining the acknowledgement message, transmit a command message to establish the BLUETOOTH A2DP wireless connection with the in-ear headphone, wherein the audio signal is transmitted to the in-ear headphone upon obtaining an acknowledgement message from the in-ear headphone that the BLUETOOTH A2DP wireless connection has been established.

19. The processor of claim 15 is further configured to determine whether the fit parameter is indicative of the fitting process performed by the in-ear headphone being a success or a failure.

20. The processor of claim 19, wherein, in response to the fit parameter being a success, the processor is further configured to 1) stop transmission of the audio signal and 2)

transmit a request to the in-ear headphone to tear down the BLUETOOTH A2DP wireless connection.

\* \* \* \* \*